United States Patent [19]

Ohyabu et al.

[11] 4,251,567
[45] Feb. 17, 1981

[54] PROCESS FOR PRODUCING A FIBROUS MILK PROTEIN PRODUCT

[75] Inventors: Shuzo Ohyabu; Syuji Kawai; Hiroyuki Akasu, all of Kurashiki; Takeo Akiya; Keiji Matsumura, both of Takatsuki; Naoki Yagi, Suita; Kwang Young Kim, Habikino; Tarushige Nakaji, Yao, all of Japan

[73] Assignees: Kuraray Co., Ltd.; Minaminihon Rakuno Kyodo Kabushiki Kaisha, both of Japan

[21] Appl. No.: 944,525

[22] Filed: Sep. 21, 1978

[30] Foreign Application Priority Data

Sep. 30, 1977 [JP] Japan .................................. 52-118480

[51] Int. Cl.³ .............................................. A23J 1/20
[52] U.S. Cl. .................................. 426/580; 426/517; 426/657; 426/802
[58] Field of Search ............... 426/656, 657, 802, 517, 426/580; 260/119

[56] References Cited

U.S. PATENT DOCUMENTS

| 2,552,129 | 5/1951 | Windus | 260/119 X |
| 2,567,184 | 9/1951 | Corwin et al. | 260/119 X |
| 2,952,543 | 9/1960 | Szczesniak et al. | 426/802 X |
| 3,645,746 | 2/1972 | Akinson | 426/802 X |
| 3,840,671 | 10/1974 | Kim et al. | 426/802 X |
| 3,900,573 | 8/1975 | Freck et al. | 426/802 X |

Primary Examiner—Marc L. Caroff
Attorney, Agent, or Firm—Jones, Tullar & Cooper

[57] ABSTRACT

A fibrous milk protein product having a high tensile elongation (115 to 380%) and an excellent stability to hot water cooking (tolerant to treatment in hot water of 135° C. for 4 minutes) which is produced by forming the starting milk protein into a fibrous composition and then treating the fibrous composition in an aqueous solution containing at least one of sodium, potassium and calcium salts and also an aldehyde type crosslinking agent having a ratio of molecular weight (M) to number of aldehyde groups (n) of 120 to 360 (e.g. lactose) at a pH of 2.5 to 6.5 and at 100° to 140° C. for 20 minutes to 3 hours.

9 Claims, 1 Drawing Figure

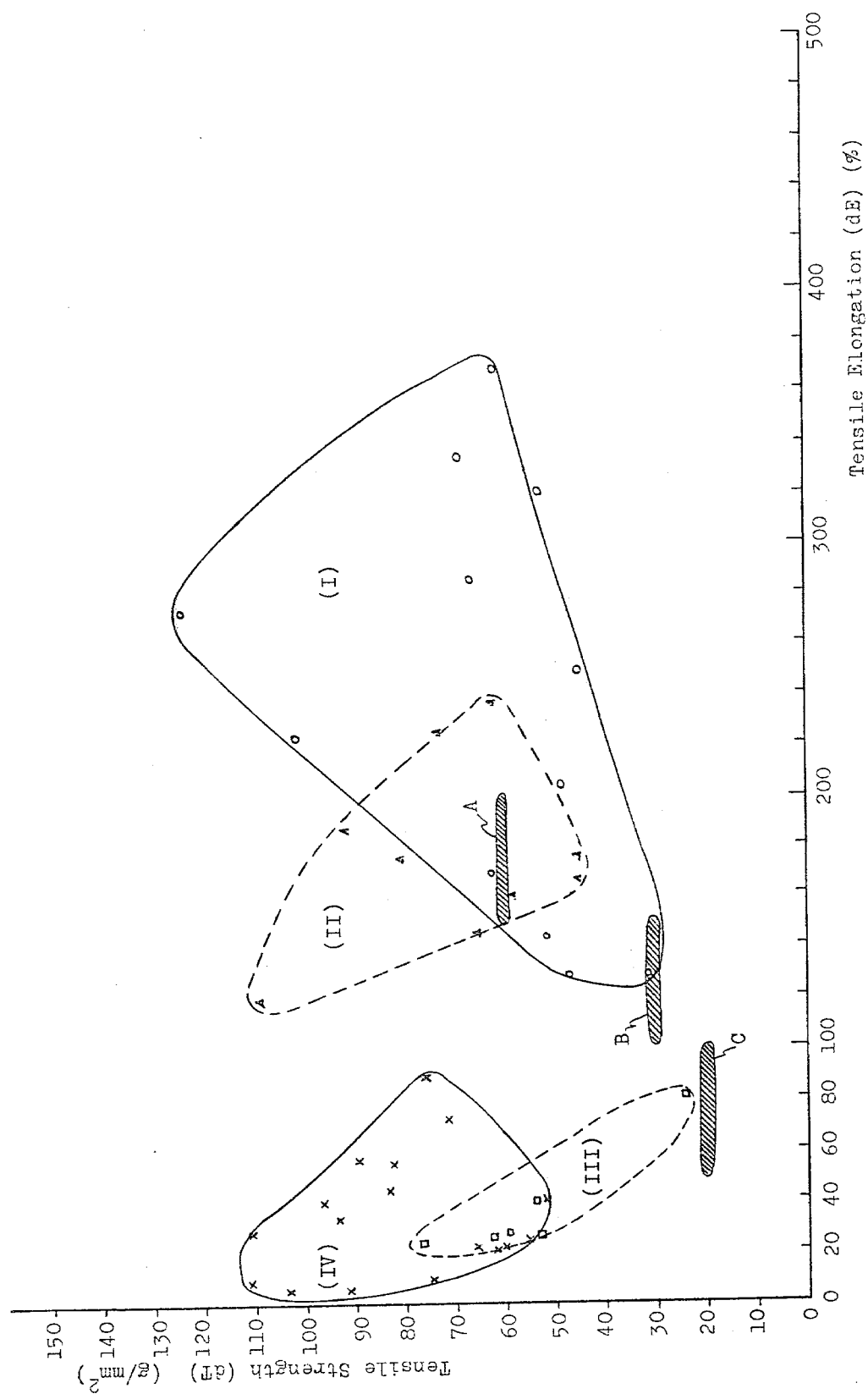

PROCESS FOR PRODUCING A FIBROUS MILK PROTEIN PRODUCT

The present invention relates to a fibrous milk protein food having a high tensile elongation and an excellent stability to hot water cooking. More particularly, it relates to a fibrous milk protein food comprising bundles of fibers of a milk protein, each fiber having a diameter of less than $10\mu$, the bundles of fibers having a tensile elongation of 115 to 380% and which can tolerate cooking in a boiling water of 135° C. for 4 minutes, and a process for the production of the same.

Recently, various studies have been done on artifical fibrous protein foods such as a meat-simulating fibrous protein food and a few products are going to be commerciallized.

Some of the present inventors have found a process for producing a meat-simulating milk protein food having a meat-like texture by applying stress to a milk protein gel composition to form a fibrous composition and subjecting the resulting fibrous composition to a heat-treatment at 60° to 170° C. while preventing the evaporation of water (Japanese Patent Laid Open Publication (unexamined) No. 130946/1977). According to this process, particularly, when heat-treated at a high temperature of 120° C. or higher, the product thus obtained has excellent chewiness (toughness), elasticity (tensile elongation) and stability to hot water cooking. However, on the other hand, the product has some drawbacks such as disappearance of the microfibril (microfibrillar structure of less than $10\mu$ in diameter), decrease of the coefficient of digestibility and nutritive value as a protein, decrease in processability owing to discoloration (browning), a bitter taste, or the like.

They have further found that there can be obtained the desired fibrous milk protein food having excellent chewiness (toughness), elasticity (tensile elongation) and stability to hot water cooking with holding the microfibril and without decrease of the coefficent of digestibility and nutritive value by pre-stabilizing a fibrous milk protein in an aqueous solution containing an acid and then actually stabilizing the resultant fibrous composition in an aqueous solution containing a salt (Japanese Patent Laid Open Publication (unexamined) No. 62861/1978, U.S. Ser. No. 760,293). Although the product obtained by this process shows an excellent stability to hot water cooking at a comparatively low temperature up to 100° C., when it is cooked at a higher temperature such as 120° C. or higher, the product shows an insufficient stability to hot water cooking. For instance, half of the microfibrillar structure of the product disappears and chewiness also lowers.

It is also known that a fibrous protein food can be prepared by freezing a solution of a fibrous protein at −30° to −80° C. and then coagulating the freezed solution by heating at 80° to 125° C., wherein a crosslinking agent such as dialdehyde type oxidized starch is also incorporated into the protein solution before freezing (Japanese Patent Laid Open Publication (unexamined) No. 112551/1976). However, the product obtained by this process is still insufficient in the stability to hot water cooking.

Another process for producing a fibrous protein food is described in East German Pat. No. 111,791, wherein a fibrous protein mixture comprising 50% of milk casein and 50% of sun flower protein is heat-treated in an aqueous solution containing sodium chloride and a dialdehyde type oxidized starch (periodate-oxidized starch) at a pH of 4 to 6 and at 20° to 120° C. for several seconds to several days in order to improve the stability to hot water cooking. The product obtained by this process has excellent stability to hot water cooking, but it is still insufficient in the tensile elongation. Moreover, the dialdehyde type oxidized starch used as a crosslinking agent in the process of East German patent is not permitted as an additive for foods in several countries such as U.S.A. and Japan.

The present invention have intensively studied to obtain the desired fibrous milk protein food having excellent tensile elongation and excellent stability to hot water cooking.

The present inventors have done the following pre-experiments.

A milk protein gel composition was pre-stabilized in an acidic bath (which contained an aqueous solution containing an acid), washed with water, neutralized, and then, the resultant composition having microfibrillar strength was heated in a 5% by weight aqueous solution of glucose at pH 6 and at 98° 1 C. for 2 hours. As a result, the fibrils were significantly fused during the heat treatment, and the product showed inferior maintenance of microfibrillar structure in hot water cooking in comparison with the product produced by the process described in Japanese Patent Laid Open Publication (unexamined) No. 62861/1978 as mentioned above.

The fibrous product treated as mentioned above was further treated in a saline bath containing a 28% by weight aqueous solution of sodium chloride at pH 5 and at 108° C. for 2 hours. The fibrous product thus obtained showed improved elasticity (tensile elongation), but when it was cooked in an autoclave containing hot water of 135° C. for 4 minutes, the microfibrillar structure thereof partially disappeared.

Alternatively, a milk protein gel composition was pre-stabilized in an acidic bath, washed with water and neutralized, and then, the resultant composition having microfibrillar structure was heated in a reducing bath containing 50 ppm of formaldehyde at pH 7 and at 98° C. for 2 hours. As a result, the microfibrils were significantly fused during the heat treatment similar to the case of using aqueous glucose solution as mentioned above. The fibrous product showed also a lower tensile elongation and no improvement of the elasticity.

The fibrous product thus treated was further treated in a saline bath containing a 28% by weight aqueous solution of sodium chloride at pH 5 and at 108° C. for 2 hours. When the resultant fibrous product was cooked in an autoclave containing hot water of 135° C. for 4 minutes, the microfibrillar structure partially disappeared, too. Thus, even by this process, the stability to hot water cooking at a higher temperature can not be achieved.

As a result of further intensive studies of the present inventors, it has been found that when a compound having aldehyde group or aldehyde type reducing group (e.g. glucose) is simultaneously incorporated into the bath for actual stabilization of the fibrous milk protein composition as disclosed in Japanese Patent Laid Open Publication (unexamined) No. 62861/1978 which contains, for example, a 28% by weight aqueous solution of sodium chloride, undesirable fusing of microfibrils almost does not occur and hence the maintenance of microfibrillar structure of the product is remarkably improved. Moreover, the fibrous product thus obtained has a larger tensile elongation than that of the products produced by the known processes, that is, it has a tensile elongation of 115 to 380%, and even when the fibrous product is cooked in hot water of 135° C. for 4 minutes in an autoclave, it shows excellent maintenance of microfibrillar structure, which means that the fibrous product obtained by this process has an excellent stability to hot water cooking. The desired fibrous product having excellent properties can be obtained with no relation to the kinds of method for formation of fibrous structure from the starting milk protein or to the kinds of the pre-stabilization method. In other words, the actual stabilization process as mentioned above can be applied to any fibrous composition produced by any combination of a method for forming a fibrous structure by a pe-stabilization method. Occasionally, the desired fibrous product can be obtained by subjecting the fibrous composition to the actual stabilization under conditions as mentioned hereinafter without subjecting to the pre-stabilization.

An object of the present invention is to provide an improved fibrous milk protein food having a high tensile elongation and an excellent stability to hot water cooking at a high temperature. Another object of the invention is to provide an improved actual stabilization method for treating fibrous composition. A further object of the invention is to provide an improved process for production of a fibrous milk protein food having a high tensile elongation and an excellent stability to hot water cooking. These and other objects and advantages of the invention will be apparent from the following description.

The fibrous milk protein food of the present invention comprises bundles of fibers comprising mainly a milk protein each fiber having a diameter of less than $10\mu$, the bundles of fibers having a tensile elongation of 115 to 380%, preferably 160 to 380%, and without fusing of microfibril by cooking in hot water of 135° C. for 4 minutes.

The process for producing the fibrous milk protein food of the present invention comprises forming the starting milk protein into fibers, and treating the resultant fibrous milk protein composition in an aqueous solution containing at least one salt selected from the group consisting of potassium salt, sodium salt and calcium salt in an amount of 1 gram equivalent/liter or more (as total concentration of cations) and at least one compound containing aldehyde group or aldehyde type reducing group and having a ratio of molecular weight (M) to number of aldehyde groups in one molecule (n) of 120 to 360 (M/n = 120–360), said aldehyde compound being present in an amount of 5 to 200 g/liter at a solution pH value of 2.5 to 6.5 and at a temperature of 100° to 140° C. for 20 minutes to 3 hours.

The compound containing aldehyde group or aldehyde type reducing group is incorporated into the aqueous solution as a crosslinking agent. The compound includes reducing monosaccharides or disaccharides (e.g. glycerose, erythrose, xylose, arabinose, ribose, glucose, fructose, galactose, mannose, rhamnose, fucose, maltose, lactose), and derivatives thereof, such as uronic acid, phosphate, sulfate, fatty acid esters or condensates of these saccharides, (e.g. glucuronic acid, mannuronic acid, galacturonic acid, glyceraldehyde-3-phosphoric acid an oxidate of glycerine monofatty acid ester e.g., glyceraldehyde monopalmitate, glyceraldehyde monostearate, condensate of glycerose, condensate or erythrose), which have the ratio (M/n) of 120 to 360. Besides, it has experimentally been found that when the ratio of molecular weight to number of aldehyde groups (M/n) of the reducing saccharides or derivatives thereof is increased, the elasticity and tensile elongation of the final fibrous milk protein product are also increased. The ratio (M/n) of the representative reducing saccharides or derivatives thereof are as follows: xylose = 150, glyceraldehyde-3-phosphoric acid = 170, glucose = 180, fructose = 180, glyceraldehyde monopalmitate = 329, maltose = 342, lactose = 342, glyceraldehyde monostearate = 357. The crosslinking agent has the ratio (M/n) of 120 to 360, preferably 180 to 360. When the ratio (M/n) is lower than 120 as in case of formaldehyde, glycolaldehyde, glyceraldehyde or glutalaldehyde, there can not be produced the desired fibrous milk protein product having a tensile elongation of 115% or more. For instance, when a dialdehyde type oxidized starch having the ratio (M/n) of 80 is used as the crosslinking agent, the fibrous milk protein product tolerates the treatment in hot water of 135° C. for 4 minutes, that is, it has a sufficient stability to hot water cooking, but it does not satisfy the condition of tensile elongation of 115 to 380%.

The accompanying figure shows the relation between the ratio (M/n) and the tensile elongation of the final product as well as tensile strength of the final product, wherein various fibrous protein products were prepared under various conditions for actual stabilization as shown in Table 1 hereinafter and the data were plotted in accordance with the tensile elongation and the tensile strength (tensile strength is calculated by the formula: toughness/tensile elongation × 200), and the area surrounded with the line or dotted line means that the products showed an excellent stability in the hot water cooking test at 135° C. for 4 minutes. In the figure, (I) is the case using lactose having M/n = 342 as the crosslinking agent (example of the present invention), (II) is the case using glucose having M/n = 180 (example of the present invention), (III) is the case using woodvinegar having M/n ≈ 50 (reference example), and (IV) is the case using dialdehyde type oxidized starch as mentioned above (M/n = 80, reference example). In this figure, there are also shown the test results of beef (A), port (B) and chicken (C) which were cooked in a boiling water for 30 minutes. As is clear from this figure, when a crosslinking agent having a small M/n ratio such as 80 or 50 is used, the fibrous products obtained do not show a tensile elongation higher than 90% even by treating under best stabilization conditions, and because of the small tensile elongation, such products have, at the best, the mechanical properties like cooked chicken. On the other hand, when a crosslinking agent having an M/n raito of 180 or 342 of the present invention is used, the fibrous products have a high tensile elongation of 115 to 380% and the mechanical properties thereof are comparable to those of cooked beef and pork of the highest quality. Other crosslinking agents having the ratio (M/n) of 120 to 360 of the present invention showed similarly excellent effects as these lactose (I) and glucose (II).

Among the crosslinking agents as mentioned above, lactose is one of the most preferably compounds. Besides, these reducing saccharides or derivatives thereof may be used in the form of a pure compound but may preferably be used in the form of a natural product, such as skim milk, casein whey, cheese whey, or a concentrated product of these natural products, or a mixture thereof. These crosslinking agents may also be used together with a small amount of other crosslinking agents having a small M/n ratio of less than 120, such as dialdehyde type oxidized starch, woodvinegar, formaldehyde, glyoxal, glycolaldehyde, lactic aldehyde, glyceraldehyde, glutalaldehyde or aldol.

The process for producing fibrous milk protein food of the present invention is explained in more detail below by a specific embodiment.

An acid casein is dissolved in aqueous ammonia, and calcium chloride is added thereto. The resulting micelles are treated with a rennet-substitute protease to form a gel composition, and the resulting gel composition is converted into a fibrous composition by applying a stress thereto, for instance, by drawing between two or more rollers, processing with rollers, extruding with a screw, mixing, spraying at a high speed, or the like. The fibrous composition thus obtained is dipped in an aqueous solution containing sodium chloride (18% by weight) and glucose or lactose (0.1—10% by weight) which is adjusted to pH 3 with sulfuric acid, for 5 minutes. To the aqueous solution are subsequently added sodium chloride and an alkali with heating gradually to give an aqueous solution containing 28% by weight of sodium chloride (pH: 5.0–5.1), and then the fibrous composition of stabilized by treating it in the resulting aqueous solution at 108° C. for 15 minutes to 4 hours.

With respect to the fibrous milk protein product obtained by the above process, various properties such as maintenance or microfibril, chewiness, elasticity and stability to hot water cooking were measured. The chewiness and elasticity were measured by a convenient method, i.e. by a tensile test, whereby the toughness and tensile elongation were measured. The results are shown in Table 1.

In the tests, the "toughness" is defined by the formula: $\frac{1}{2}(dT \times dE/100)$ wherein dT is a tensile strength per unit sectional area (g/mm$^2$) and dE is a tensile elongation (%).

The maintenance of microfibril is evaluated as follows:

⊙: More than 90% of microfibrils are maintained.
o: 60 to 90% of microfibrils are maintained.
Δ: 30 to 60% of microfibrils are maintained.
x: A few microfibrils (less than 30%) are maintained.
xx: Microfibrils disappear completely.

The stability to hot water cooking is evaluated by treating in hot water of 135° C. for 4 minutes and then evaluating the maintenance of microfibril of the fibrous product thus treated in the same manner as described above.

TABLE 1

| Conditions for actual stabilization | | | | | | | |
|---|---|---|---|---|---|---|---|
| Concentration of sodium chloride (% by weight) | Crosslinking agent Kind | Concentration (% by weight) | Stabilization period of time | Maintenance of fibril | Toughness (Chewiness) (g/mm$^2$) | Tensile elongation (elasticity) (%) | Stability to hot water cooking (135° C. × 4 min.) |
| 28 | Glucose | 0.1 | 15 min. | Δ | 4 | 30 | × |
| | | | 30 min. | o | 6 | 34 | × |
| | | | 1 hour | o | 14 | 62 | Δ |
| | | | 2 hours | o | 27 | 98 | o |
| | | | 3 hours | ⊙ | 40 | 155 | o |
| | | | 4 hours | ⊙ | 45 | 159 | o |
| 28 | Glucose | 1 | 15 min. | Δ | 7 | 38 | × |
| | | | 30 min. | o | 10 | 50 | Δ |
| | | | 1 hour | ⊙ | 12 | 63 | o |
| | | | 3 hours | ⊙ | 37 | 166 | ⊙ |
| | | | 4 hours | ⊙ | 46 | 160 | ⊙ |
| 28 | Glucose | 5 | 15 min. | o | 5 | 38 | Δ |
| | | | 30 min. | ⊙ | 10 | 51 | o |
| | | | 1 hour | ⊙ | 74 | 237 | ⊙ |
| | | | 2 hours | ⊙ | 70 | 176 | ⊙ |
| | | | 3 hours | ⊙ | 65 | 120 | ⊙ |
| | | | 4 hours | ⊙ | 40 | 73 | ⊙ |
| 28 | Glucose | 10 | 15 min. | o | 9 | 54 | o |
| | | | 30 min. | ⊙ | 40 | 176 | ⊙ |
| | | | 1 hour | ⊙ | 85 | 187 | ⊙ |
| 28 | Lactose | 0.1 | 1 hour | o | 12 | 65 | × |
| | | | 2 hours | o | 26 | 98 | Δ |
| | | | 3 hours | ⊙ | 40 | 166 | o |
| | | | 4 hours | ⊙ | 45 | 150 | o |
| 28 | Lactose | 1 | 15 min. | Δ | 5 | 35 | × |
| | | | 30 min. | o | 8 | 60 | o |
| | | | 1 hour | ⊙ | 12 | 86 | o |
| | | | 2 hours | o | 30 | 129 | ⊙ |
| | | | 3 hours | ⊙ | 49 | 204 | ⊙ |
| | | | 4 hours | ⊙ | 37 | 182 | o |
| 28 | Lactose | 5 | 15 min. | o | 6 | 46 | Δ |
| | | | 30 min. | o | 11 | 82 | o |
| | | | 1 hour | ⊙ | 19 | 125 | ⊙ |
| | | | 2 hours | ⊙ | 53 | 170 | ⊙ |
| | | | 3 hours | ⊙ | 170 | 274 | ⊙ |
| | | | 4 hours | ⊙ | 86 | 130 | o |
| 28 | Lactose | 10 | 1 hour | ⊙ | 21 | 152 | o |
| | | | 2 hours | ⊙ | 112 | 370 | ⊙ |
| | | | 3 hours | ⊙ | 114 | 335 | ⊙ |
| | | | 4 hours | ⊙ | 95 | 286 | ⊙ |
| 28 | — | — | 15 min. | Δ | 4 | 30 | × |
| | | | 30 min. | o | 5 | 30 | × |
| | | | 1 hour | o | 12 | 60 | Δ |
| | | | 2 hours | o | 22 | 95 | Δ |

TABLE 1-continued

| Conditions for actual stabilization | | | | | | | |
|---|---|---|---|---|---|---|---|
| Concentration of sodium chloride (% by weight) | Crosslinking agent | | Stabilization period of time | Maintenance of fibril | Toughness (Chewiness) (g/mm$^2$) | Tensile elongation (elasticity) (%) | Stability to hot water cooking (135° C. × 4 min.) |
| | Kind | Concentration (% by weight) | | | | | |
| | | | 3 hours | O | 39 | 153 | o |
| | | | 4 hours | O | 44 | 160 | o |

As is clear from the test results shown in Table 1, when the crosslinking agents such as glucose and lactose are used in an appropriate concentration and the stabilization is carried out for an appropriate period of time, the properties of the fibrous products, such as maintenance of microfibril, toughness (chewiness), tensile elongation (elasticity) and stability to hot water cooking, are extremely improved.

The crosslinking agent, i.e. the compound containing aldehyde group or aldehyde type reducing group is used in an amount of 5 to 200 g/liter, preferably 10 to 200 g/liter. When the amount of the crosslinking agent is less than 5 g/liter, the three dimensional crosslinked structure owing to aminocarbonyl reaction is insufficiently produced, and hence, the fibrous product thus obtained has inferior maintenance of microfibril, chewiness (toughness), elasticity (tensile elongation) and stability to hot water cooking. On the other hand, when the amount of crosslinking agent is more than 200 g/liter, the three dimensional crosslinking density becomes too large, and then, the fibrous product has significantly low elasticity (tensile elongation) and chewiness (toughness). When a natural product containing reducing saccharides or derivatives thereof such as cheese whey, casein whey, skim milk or the like is used, it should be used in an amount so that the total amount of the reducing compounds is in the above range. Occasionally, a natural product containing other reducing compounds having M/n of less than 120, such as wood-vinegar, may be used together, but merely as an additional crosslinking agent.

The salts to be contained in the aqueous solution for the actual stabilization include sodium salts (e.g. sodium chloride, sodium sulfate, sodium acetate), potassium salts (e.g. potassium chloride, potassium sulfate, potassium acetate), calcium salts (e.g. calcium chloride, calcium sulfate, calcium acetate), or the like, which may be used alone or in a combination of two or more thereof. The salts may be used in a cationic concentration of at least 1 gram equivalent/liter, preferably at least 3 gram equivalent/liter. When the concentration of the salt is less than 1 gram equivalent/liter, the microfibrils are significantly fused during the stabilization treatment and hence it is difficult to maintain the microfibrils and the chewiness (toughness) is not improved either. The upper limit of the concentration of the salt varies with the kinds of salts, and may be up to the saturation solubility of the salt. For instance, in case of sodium chloride, it is used in a cationic concentration of 1 to 6 gram equivalent/liter.

The stabilization with the salt-containing aqueous solution may be carried out at a pH value of 2.5 to 6.5, preferably 3.4 to 5.6. When the pH value is less than 2.5 or more than 6.5, microfibrils are fused during the stabilization treatment and the microfibrillar structure disappears. The temperature for the stabilization may be in the range of 100° to 140° C., preferably 104° to 140° C. When the temperature is lower than 100° C., the microfibrils may be maintained, but the chewiness (toughness) and elasticity (tensile elongation) of the fibrous product are not improved. On the other hand, when the temperature is higher than 140° C., the maintenance of microfibril is lower and the fibrous product is largely heat-deteriorated which results in lowering of nutritive value and occurrence of bitter taste.

Besides, the period of time for stabilization is preferably from about 20 minutes to 3 hours. When the stabilization period of time is shorter than 15 minutes, the chewiness (toughness) and elasticity (tensile elongation) of the product are not so improved, and these properties are improved with increase of the stabilization time and become maximum at 2 to 3 hours. Longer stabilization time than 3 hours gives no longer improvement of the chewiness (toughness) and elasticity (tensile elongation) to the product, but rather gives unfavorable effects, such as lowering of nutritive value due to heat-deterioration, occurrence of bitter taste, or the like.

According to the process of the present invention, it is not necessarily required to subject the fibrous composition to the pre-stabilization under specific conditions as disclosed in Japanese Patent Laid Open Publication (unexamined) No. 62861/1978. That is, in the process of the present invention, a reaction with the reducing aldehyde and dehydration and de-phosphorization reaction with alkali ion proceed side by side, and hence, even if pre-stabilization is carried out by any means, such as coagulation with an acid, dehydration with an acid, crosslinkage with aldehyde, crosslinkage by dephosphorization, or the like, it does almost not effect on the structure and properties of the product. It has experimentally been confirmed that the protein structure and fibrous structure and also the properties of the final fibrous product are mainly effected by the conditions in the actual stabilization, which is clear in view of the reaction rate and equilibrium of the reaction. Thus, any pre-stabilization may be applied merely for the purposes of preventing undesirable aging, fusing and cutting of microfibrils during the period from the formation of fibers to the actual stabilization, and further preventing re-fusing and disappearance of microfibrils due to rising of temperature and change of pH value at the first stage of the actual stabilization. It is practical and convenient to proceed previously a part or whole of the same reactions as in the actual stabilization but under milder conditions. For instance, one or more of the treatment with an acid, the treatment with a neutral salt and the treatment with a reducing aldehyde are applied alone or in a combination thereof in a liquid bath or a steam bath under milder conditions, such as a lower temperature, a shorter period of time or a lower concentration of the reagents. When the treatment with an acid is applied, it may be carried out under conditions similar to those described in Japanese Patent Laid Open Publication (unexamined) No. 62861/1978, i.e. in a concentration of an acid: 0.5-25% by weight, temperature: 40° C. or lower, period of time: 10 second-5 minutes, pH value: 0-5.

When the pre-stabilization is carried out by using a neutral salt, it is preferable to do so under the conditions of a concentration of salt: 10-25% by weight and pH value: 0-3 (regulated with an acid), wherein the salt may be sodium, potassium or calcium salt, such as sodium chloride, sodium sulfate, sodium acetate, potassium chloride, potassium sulfate, potassium acetate, calcium chloride, calcium sulfate, or calcium acetate, which may be used alone or in a combination of two or more thereof.

When the pre-stabilization is carried out by using a reducing aldehyde in the form of an aqueous solution or vapor thereof, aldehyde compounds such as formaldehyde, glyoxal, glycolaldehyde, lactic aldehyde, glyceraldehyde, methylglyoxal, aldol, glutalaldehyde or the like are useful. The reducing aldehyde may be used together with an acid or a neutral salt in order to prestabilize the composition to be treated within a short period of time. For instance, it is preferable to do the pre-stabilization by dipping in a 1% aqueous solution of woodvinegar at pH of 0-3 and at 40° C. for 15 minutes to 1 hour.

An aqueous solution containing a dehydrating agent (e.g. acetic anhydride) or an oxidizing agent (e.g. sodium hypochloride) is also useful for pre-stabilization.

The most preferable pre-stabilization method is to dip the fibrous composition into the same solution as used in the actual stabilization or a modified solution thereof (e.g. a part of the components is omitted or the concentration of the components is changed) under milder conditions for a fixed period of time. This method is economical and convenient. For instance, the fibrous composition to be treated is dipped in an aqueous solution, which contains 5% by weight of sodium chloride, 5% by weight of glucose or lactose and is regulated to a pH value of 0-3 with sulfuric acid, at 40° C. for 5 to 10 minutes, and subsequently, sodium chloride and an alkali are added to the aqueous solution while raising the temperature and then the fibrous composition is subjected to the actual stabilization in the resulting aqueous solution. According to this method, it is not necessary to prepare two kinds of bath for pre-stabilization and for actual stabilization, and further, the bath can repeatedly be used with ease.

The fibrous composition used in the present invention is prepared from mainly a milk protein, such as a milk, a skim milk, a condensate or dried product thereof, casein, casein coprecipitates, whey protein, or the like, which may usually be used in the form of micelles or a solution dissolved in an aqueous solution of an alkali metal salt (e.g. sodium hydroxide, potassium carbonate), an alkaline phosphate (e.g. sodium phosphate), or ammonia. The fibrous composition may contain as the sub-starting material a few to 20% by weight of other animal or vegetable proteins, such as gelatin, blood powder, soy bean protein, gluten, which may also be admixed with animal or vegetable fats and oils, such as butter oil, tallow, lard, fish oil, whale oil, soy bean oil, cotton seed oil, palm oil, coconut oil, or hardened oil of these oils, or carbohydrates, such as, starch, dextrin, gum arabic, okra gum, ghatti gum, curdlan, carrageenan, karaya gum, xanthan gum, agar, guar gum, konjak-mannan, tragacanth gum, furcellaran, pectin, or the like.

These milk proteins in the form of a micellar structural composition, a solution or a mixture with a animal or vegetable protein, a fat, an oil and/or a carbohydrate may be converted into a fibrous composition by extruding it from a spinneret. Alternatively, the above solution or mixture of the starting milk protein may be converted into a fibrous composition by adding thereto calcium ion or magnesium ion to form micelles and (a) treating the resulting micells with a protease such as trypsin, chymotripsin, papain, rennet or rennet-substitute protease to form a gel composition; or (b) adjusting the pH value thereof to 5.0 to 6.5 and heating it to form a gel composition; or (c) treating the resulting micelles with a reducing agent such as sodium bisulfite or $\beta$-mercaptoethanol to form a gel composition; and then applying a stress to the resulting gel composition to form an oriented fibrillar composition. The stress applied to the gel composition includes various mechanical stresses, for instance, by drawing between two or more rollers, processing with rollers, extruding with a screw, mixing, spraying at a high speed or the like.

The fibrous milk protein product may also be admixed with other appropriate additives, such as colorants, seasonings, flavors, or the like in order to improve the appearance, taste, texture, or the like.

The present invention is illustrated by the following Examples, but is not limited thereto.

EXAMPLE 1

To a suspension of acid casein (25 g) in warm water (100 ml) at 50° C. is added a 28% aqueous ammonia (1.3 ml) to give a solution. To the solution is added a 25% aqueous calcium chloride solution (10 ml) to form a micellar structural composition. The micelle is treated with rennet-substitute protease (20 mg) to form a gel composition. The resulting gel composition is orientated and fibrilated by drawing to give a fibrous composition. The fibrous composition thus obtained is pretreated by dipping it into an aqueous solution (1 liter) containing 10% by weight of sulfuric acid at room temperature for 1 minute and then actually stabilized by dipping into a saline bath of pH 5.0-5.1 containing 5% (60 g/liter) by weight of lactose and 28% (5.8 gram equivalent/liter) by weight of sodium chloride at 108° C. for 2 hours. After washing with water and draining off the water, there is obtained a fibrous protein product having a water content of about 70% by weight (80 g).

The fibrous product maintains about 90% of the microfibrillar structure. When the product is treated in a hot water of 135° C. for 4 minutes in an autoclave, the microfibrillar structure is almost maintained and the product has an excellent stability to hot water cooking. Moreover, the product has a toughness (chewiness) of 3 g/mm$^2$ (before actural stabilization) and 53 g/mm$^2$ (after actual stabilization) and has a tensile elongation of 170%.

REFERENCE EXAMPLE 1

In the same manner as described in Example 1 except that a dialdehyde type oxidized starch having the same equivalent aldehyde group (1.2% by weight=14 g/liter) is used instead of the lactose, a fibrous protein product is prepared. While the fibrous protein product thus obtained has the same stability to hot water cooking by the treatment in a hot water of 135° C. for 4 minutes as that of the product of Example 1, but the product shows such a small tensile elongation as 22% and a toughness of 7 g/mm$^2$ (after actual stabilization.

EXAMPLE 2

Under the same conditions as described in Example 1, a fibrous composition is prepared by drawing a gel composition. The resulting fibrous composition (80 g) is pretreated by dipping it into an aqueous solution containing skim milk (25% by weight=300 g/liter; about 1.2% by weight=1.4 g/liter as lactose component) and sodium chloride (18% by weight=3.6 ram equivalent/liter) and having a pH of 2.9–3.1 (adjusted with sulfuric acid) at room temperature for 1 minute. Subsequently, to the aqueous solution are added sodium chloride and an alkali to give an aqueous solution containing 28% by weight (5.8 gram equivalent/liter) of sodium chloride and a pH of 5.0–5.1. The resulting aqueous solution containing the fibrous composition is heated till 108° C. with rising rate of 80° C./hour and maintained at 108° C. for 2 hours. After washing with water and draining off the water, there is obtained a fibrous protein product having a water content of about 69% by weight (about 78 g).

The fibrous product thus obtained maintains about 90% or more of the microfibrillar structure. When the product is treated in a hot water of 135° C. for 4 minutes in an autoclave, the microfibrillar structure is almost maintained and the product has an excellent stability to hot water cooking. Moreover, the product has a toughness (chewiness) of 4 g/mm$^2$ (before actual stabilization) and 40 g/mm$^2$ (after actual stabilization) and has a tensile elongation of 150%.

EXAMPLE 3

Under the same conditions as described in Example 1, a fibrous composition is prepared by drawing a gel composition. The resulting fibrous composition is pretreated by dipping it into an aqueous solution containing xylose (10% by weight=120 g/liter) and sodium sulfate (15% by weight=2.5 gram equivalent/liter) and having a pH of 1.0–1.1 (adjusted with sulfuric acid) at room temperature for 3 minutes. Subsequently, to the aqueous solution containing the fibrous composition are added sodium sulfate and sodium hydroxide to give an aqueous solution containing 29% by weight (4.7 gram equivalent/liter) of sodium sulfate and having a pH of 4.0–4.1, which is gradually heated until 104° C. and maintained at 104° C. for 2.5 hours. After washing with water and draining the water, there is obtained a fibrous protein product having a water content of 72% by weight (about 80 g).

The fibrous product thus obtained maintains about 90% of the microfibrillar structure. When the product is treated in a hot water of 135° C. for 4 minutes in an autoclave, the microfibrillar structure is almost maintained and the product has an excellent stability to hot water cooking and a toughness (chewiness) of 3 g/mm$^2$ (before actual stabilization) and 90 g/mm$^2$ (after actual stabilization) and also has a tensile elongation of 190%.

EXAMPLE 4

To a skim milk (1 liter) cooled to 5° C. is added with agitation a 10% aqueous calcium chloride solution (8 ml), and thereto is added dropwise acetic acid to adjust the pH of the solution to 5.0. The mixture is heated at 60° C. for about 10 minutes to form a gel composition. The resulting gel composition is extruded with a screw to orientate and fibrilate. The resulting fibrous composition is dipped into an aqueous solution containing 5% by weight of 93% acetic anhydride at room temperature for 3 minutes. To the aqueous solution containing the fibrous composition are subsequently added glucose and sodium chloride so as to become 5% by weight (60 g/liter) and 28% by weight (5.8 gram equivalent/liter) in the final concentration, respectively. While keeping the pH value of the solution at 4.2–4.3 with an alkali, the solution is heated until 108° C., and maintained at this temperature for 2 hours. After washing with water and draining the water, there is obtained a fibrous protein product having a water content of about 70% by weight (about 75 g).

The fibrous product thus obtained maintains about 90% of the microfibrillar structure. When the product is treated in a hot water of 135° C. for 4 minutes in an autoclave, the microfibrillar structure is almost maintained and the product has an excellent stability to hot water cooking and a toughness (chewiness) of 18 g/cm$^2$ (before actual stabilization) and 72 g/mm$^2$ (after actual stabilization) and also has a tensile elongation of 175%.

EXAMPLE 5

An aqueous mixture containing 10% by weight of glycerin monostearate and 33 mg/liter of ferrous sulfate hydrate is adjusted to pH 4.5 with sulfuric acid and heated at 80° C. while adding gradually a 35% aqueous hydrogen peroxide solution in an amount of 400 ppm of hydrogen peroxide over a period of 30 minutes with constant stirring. The obtained aqueous mixture contains aldehyde compounds in an amount of 7,000 ppm (7 g/liter) (converted into glyceraldehyde monostearate).

The pre-stabilized fibrous product (65 g) is obtained in the same manner as described in Example 1, and then dipped into an aqueous composition comprising 720 ml of above-mentioned aqueous mixture and 280 g of sodium chloride (5.8 gram equivalent/liter), and then actually stabilized at 109° C. and at pH 4.6–4.7 (adjusted with an alkali) for 2 hours with constant stirring. After washing with water and draining the water, there is obtained a fibrous protein product having a water content of about 68% by weight (about 60 g).

The fibrous product thus obtained maintains about 90% of the microfibrillar structure. When the product is treated in a hot water of 135° C. for 4 minutes in an autoclave, the microfibrillar structure is almost maintained and the product has an excellent stability to hot water cooking and a toughness (chewiness) of 3 g/mm$^2$ (before actual stabilization) and 43 g/mm$^2$ (after actual stabilization) and also has a tensile elongation of 125%.

REFERENCE EXAMPLE 2

Under the same conditions as described in Example 1, a fibrous composition is prepared by drawing a gel composition. The resulting fibrous composition (about 80 g) is pretreated by dipping it into an aqueous solution containing 1% (10 g/liter) woodvinegar (1 liter) having a pH of 2 (adjusted with sulfuric acid) at room temperature for 5 minutes. To the aqueous solution containing the fibrous composition is subsequently added sodium chloride until the concentration of sodium chloride becomes 28% by weight (5.8 gram equivalent/liter), and the aqueous solution is adjusted to pH 5.0–5.1 with an alkali, heated gradually until 108° C. and maintained at 108° C. for 2.5 hours. After washing with water and draining the water, there is obtained a fibrous protein product having a water content of about 68% by weight (about 75 g).

The fibrous product thus obtained maintains about 90% of the microfibrillar structure. When the product is treated in hot water of 135° C. for 4 minutes, the microfibrillar structure is almost maintained and the product has an excellent stability to hot water cooking. However, the product shows such a small toughness (chewiness) as 3 g/mm² (before actual stabilization) and 8 g/mm² (after actual stabilization) and a low tensile elongation of 36%.

APPLIED TEST

By using the fibrous protein products obtained in the above Examples 1 and 4 and Reference Example 1, there were prepared Hamburg steaks in the following manner.

A minced meat mixture obtained by grinding together beef and pork (60% by weight) was mixed with the fibrous product obtained in Example 1 to 4 or Reference Example 1 (cut in a size of 3 mm, 40% by weight). The mixture thus obtained (1 part by weight) was admixed with starch (0.05 part by weight), minced onion (0.25 part by weight), bread powder (0.1 part by weight), liquid egg glair (0.2 part by weight) and a small amount of a spice and meat extract and then cooked.

48 panellers tested the Hamburg steaks. The results of the panel test are shown in Table 2.

TABLE 2

| | Hamburg steak prepared by using the fibrous product in Example | | |
|---|---|---|---|
| | Example 1 | Example 4 | Reference Example 1 |
| Cracking during cooking | | | |
| Yes | 1 | 2 | 16 |
| No | 47 | 46 | 32 |
| Flexibility (owing to tensile elongation) | | | |
| Excellent | 40 | 35 | 3 |
| Medium | 8 | 12 | 15 |
| Poor | 0 | 1 | 30 |
| Homogeneity (no feeling of disorder due to the fibrous product in Hamburg steak) | | | |
| Excellent | 43 | 40 | 11 |
| Medium | 4 | 6 | 21 |
| Poor | 1 | 2 | 16 |

What is claimed is:

1. A process for producing a fibrous milk protein product having a high tensile elongation and stability to hot water cooking, which comprises forming a starting milk protein into a fibrous composition, and contacting the fibrous composition with an aqueous solution containing at least one salt selected from the group consisting of a sodium salt, a potassium salt and a calcium salt in a cationic concentration of 1 gram equivalent/liter or more and a compound containing an aldehyde group and having a ratio of molecular weight (M) to number of aldehyde groups in one molecule (n) of 120 to 360, said aldehyde compound being present in the solution in an amount of 5 to 200 g/liter, the aqueous solution having a pH value of 2.5 to 6.5, said fibrous composition being maintained in contact with said solution at a temperature of 100 to 140° C. for 20 minutes to 3 hours.

2. A process according to claim 1, wherein the concentration of total cations is 3 gram equivalent/liter or more and the compound containing aldehyde group has the ratio (M/n) of 180 to 360.

3. A process according to claim 1, wherein the aldehyde compound is a reducing saccharide or its derivative or a natural product containing the reducing saccharide or its derivative.

4. A process according to claim 3, wherein the aldehyde compound is a member selected from the group consisting of glycerose, erythrose, xylose, arabinose, ribose, glucose, fructose, galactose, mannose, rhamnose, fucose, maltose, lactose and uronic acids, phosphates, sulfates, fatty acid esters and condensates of these saccharides with a ratio (M/n) of 120 to 360.

5. A process according to claim 4, wherein the aldehyde is derived from an oxidate of glycerine monofatty acid ester.

6. A process according to claim 3, wherein the aldehyde compound is derived from a member selected from the group consisting of a skim milk, cheese whey, casein whey and a concentrated product thereof.

7. A process according to claim 1 or 2, wherein the fibrous composition is treated at a temperature of 104 to 140° C.

8. A process according to claim 4, wherein the compound is lactose.

9. A process according to claim 4, wherein the compound is glucose.

* * * * *